Feb. 16, 1926.
R. RÜDENBERG ET AL
1,572,959
RAPID REGULATION OF THE VOLTAGE IN CONDUCTOR SYSTEMS
Filed Jan. 16, 1923
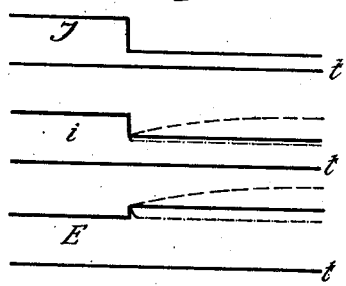
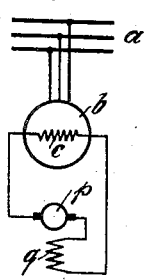
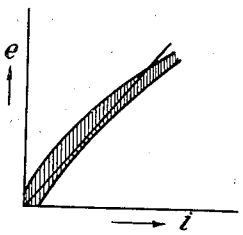
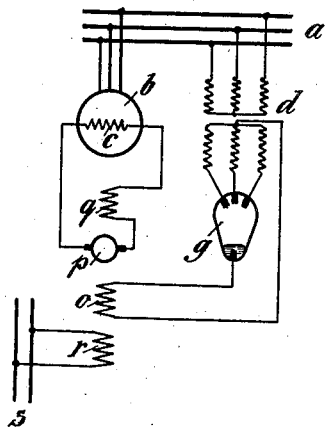
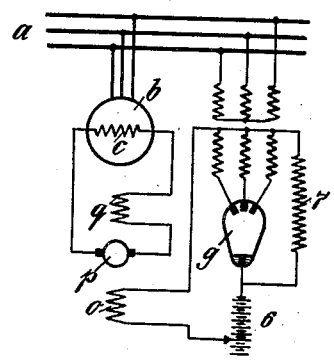
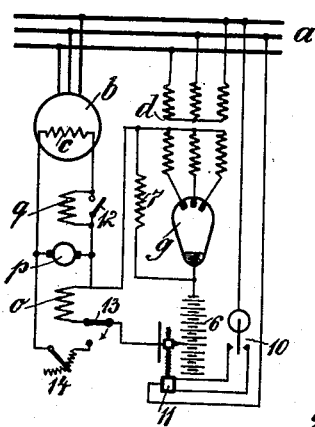

Patented Feb. 16, 1926.

1,572,959

UNITED STATES PATENT OFFICE.

REINHOLD RÜDENBERG, OF BERLIN-CHARLOTTENBURG, CARL TRETTIN, OF BERLIN, AND GERHARD KÖHLER, OF BERLIN-WILMERSDORF, GERMANY, ASSIGNORS TO SIEMENS-SCHUCKERTWERKE GESELLSCHAFT MIT BESCHRÄNKTER HAFTUNG, OF SIEMENSSTADT, NEAR BERLIN, GERMANY, A GERMAN CORPORATION.

RAPID REGULATION OF THE VOLTAGE IN CONDUCTOR SYSTEMS.

Application filed January 16, 1923. Serial No. 613,026.

*To all whom it may concern:*

Be it known that we, REINHOLD RÜDENBERG, CARL TRETTIN, and GERHARD KÖHLER, citizens of the German Empire, residing, respectively, at Berlin-Charlottenburg, Germany, Berlin, Germany, and Berlin-Wilmersdorf, Germany, have invented certain new and useful Improvements in or Relating to the Rapid Regulation of the Voltage in Conductor Systems, of which the following is a specification.

Our invention relates to the rapid regulation of the voltage in conductor systems, particularly in main conductors.

For the rapid and emergency regulation of alternating current generators the field of the generator is as a rule excited in shunt and the voltage kept constant when the load varies by the automatic adjustment of a resistance in the exciting circuit of the alternating current machine or in the shunt circuit of the continuous current machine. This regulating arrangement functions adequately when the variations in the load take place slowly, but when the variations in the load are very rapid, the regulation is only effected with a very considerable delay, so that in generators with a strong natural variation of voltage the necessary adjustment takes place only after the lapse of several seconds, during which time the voltage frequently exceeds and drops below the standard amount and only adjusts itself to the final voltage after oscillatory phenomena have occurred.

A more accurate investigation of the reactions which take place shows that when the load on an alternating current machine varies suddenly the exciting current does not remain constant, as has hitherto been assumed, merely requiring adjustment by special means to a value corresponding to the higher or lower load. Measurements have shown that far-reaching superposition effects ensue. In consequence thereof the exciting current increases or decreases simultaneously with the increase or decrease in the load current owing to electro-magnetic reaction. Moreover this increase or decrease occurs to such an extent that the natural variation in the voltage of the generator under nonvarying conditions is for the most part eliminated. This increase or decrease of the exciting continuous current, the electromotive force of which is to be ascribed to the alternating current machine, dies down after a short time in the known exciting arrangements to the value which existed before the occurrence of the load impulse.

In accordance with our present invention the regulation of these machines is considerably accelerated by so controlling the exciting current of the generator that its value, which tends to adjust itself automatically in consequence of the variation in the load, is kept absolutely or approximately constant. The dying down of the exciting current is therefore prevented, the electromotive force of the exciting machine being varied simultaneously with the load impulse and to such an extent as is necessary to influence permanently the exciting current which is strengthened or weakened by the load current as the case may be.

In order that the invention may be clearly understood and readily carried into effect it will now be described more fully with reference to the accompanying diagrammatic drawings.

In these drawings:—

Figs. 1 and 3 represent curve diagrams to be explained hereinafter;

Fig. 2 represents a circuit diagram of one form in which our invention may be reduced to practice;

Fig. 4 represents a circuit diagram showing the manner in which the exciting machine may be stabilized;

Fig. 5 represents a modification in which the two auxiliary exciting windings are combined in one; and Fig. 6 represents a modification similar to that shown in Fig. 5 with the addition of supplementary regulating means for the battery voltage.

In Figure 1 is illustrated the course of the currents and voltages in relationship to the time $t$. The current of the alternating current generator $J$ is supposed to be suddenly decreased for example by the switching off of the load. The exciting current $i$ then decreases also to a corresponding extent as above described. If the exciting current of the generator is left unaffected, it will gradually rise to the original value as shown by the dotted curve in accordance with the time constant of the alternating current generator, while the field of the alternating current machine and consequently the electromotive force remains constant during the first moment after the switching off has occurred. The terminal voltage E rises to a lesser extent in accordance with the elimination of a portion of the stray voltage. In proportion as the exciting current now approaches its original value, the terminal voltage also continues to rise, as shown by the dotted curve and likewise attains its stationary value.

If now in accordance with the present invention the electromotive force of the exciting machine be brought, immediately after the switching operation, to the value which corresponds to the exciting current which automatically flows, as explained before, immediately after the change in load, the exciting current $i$ has no cause to rise in the direction of the dotted curve. The current $i$, on the contrary, remains constant as shown by the lower full line $i$ curve and consequently the field in the alternating current generator remains completely unchanged, while the terminal voltage E only varies by a slight amount corresponding to the elimination of a portion of the stray voltage and then remains constant as shown by the higher full line E curve in Figure 1.

For carrying out the method of regulation in accordance with the present invention an exciting machine is used which is connected up in series excitation and operates in indifferent equilibrium. That is to say the series machine operates on the straight ascending portion of its characteristic curve on which the output voltage varies substantially proportionate with the load. Figure 2 shows the diagram of connections of such an arrangement. The mains $a$ are fed by the generator $b$ having the exciting winding $c$. $p$ represents the exciting machine with the series field winding $q$. The series machine is so constructed and driven at such a speed that its line of resistance coincides with the straight or approximately straight portion of its characteristic (see Figure 3) and so that it works in this range. Every variation in the exciting current $i$ caused by sudden increase or decrease of the load on the alternating current generator then produces a proportional variation in the exciting voltage $e$ so that the desired conditions above mentioned and shown in Figure 1 are at once produced.

In order to obtain coincidence of the straight part of the magnetic characteristic with the line of resistance over as great a range of output as possible, it may be convenient to produce in the exciting machine great hysteresis, so that its characteristic takes the form of a broad flat strip (shown shaded in Figure 3) within which runs the straight line of resistance of the circuit. The exciting machine has for this purpose a sheet metal yoke and is constructed so as to have small saturation throughout its entire magnetic circuit so that a slightly curved characteristic results.

Various means may be employed in order to stabilize the exciting machine working on the straight part of its characteristic and in a state of indifferent voltage equilibrium. It may be accomplished for instance by means of an auxiliary excitation A suitable arrangement is shown for instance in Figure 4. The exciting machine $p$ which is again constructed as a self excited series machine, and works in its state of indifferent voltage equilibrium, is provided with a regulating winding $o$ and a standard excitation winding $r$, which latter is fed from a direct current main $s$ at constant voltage, and which is wound so as to oppose the effect of coil $o$. The winding $o$ is affected by the fluctuations of current in the alternating current mains $a$, for which purpose it is supplied with rectified current from a rectifier $g$ whose output is subject to the voltage in the alternating current mains. The rectifier is connected to the mains preferably through a transformer $d$. Therefore when the voltage in the mains varies, the field of the exciting machine produced by coil $o$ also varies. Since, however, as aforementioned, coils $o$ and $r$ oppose each other, coil $o$ can effectively influence excitation only after its field has overcome the effect of standard coil $r$. The exciting machine now varies the current which it supplies to the exciting winding of the generator until the standard value of the voltage of the mains which is predetermined by the amount of current flowing through coil $r$ is attained, and the exciting machine is once again in equilibrium.

By suitably choosing the ampere turns of coil $r$, the value of the voltage in the mains which should be maintained constant by the arrangement can thus be predetermined.

A rectifier $g$ is used to transmit the voltage fluctuations of the mains to the regulating winding, because in such an arrangement variations in the alternating current mains react very rapidly on the exciting machine on account of the rectifier like every other vacuum tube possessing no magnetic inertia. The self excited series exciting machine, which is in a state of indifferent equilibrium, is likewise very sensitive to variations in excitation so that by means of these arrangements alone speeds of regulation can be obtained which are considerably higher than the speeds obtainable by means of the usual rapid or emergency arrangements.

The speed of regulation can be further increased if an intensifying device of any suitable kind is interposed between the alternating current mains and the control of the exciting machine, such for example as a transformer the iron frame of which is so highly saturated that its secondary voltage increases more than proportionally with the voltage to be regulated. Owing to the peculiarity of the intensifying arrangement the fluctuations in the mains are reproduced in a considerably intensified measure in the continuous current circuit and with such an arrangement in the alternating current circuit any desired multiple of variations can be obtained in the continuous current circuit. By means of this arrangement it is possible still further to increase the speed of the regulation to quite a considerable extent. The well known electron tubes (including both those of the gas-filled and non-gas-filled type) may also be usefully employed as intensifiers, these tubes being used either singly or in cascade.

The arrangement such as is shown in Figure 4 is primarily intended to illustrate the fundamental idea of the regulating method. In this arrangement the regulation of the field of the exciting machine occurs by the alternative effect of two windings, namely, by the control winding $o$ affected in accordance with the voltage variations in the mains and by the auxiliary winding $r$ supplied from a constant voltage direct current source. However, in practice it would be preferable to combine the two windings $o$ and $r$ into one single auxiliary winding, which in this case would be supplied from two sources of current opposing each other, of which sources one is constant and the other variable. Thus in the state of equilibrium this auxiliary winding would carry no current, but is only traversed by current when a potential exists different from normal.

Such an arrangement is shown in Figure 5. In this figure, the mains $a$ are fed from the generator $b$, excited by an exciting dynamo $p$ which in turn is excited by a series winding $q$ and an auxiliary winding $o$. The auxiliary exciting winding is subject to the differential action on one hand of the voltage of the rectifier $g$ (variable, as explained before, in dependence on the voltage in the mains) which is fed across the transformer $d$ to the mains $a$, and on the other hand the constant voltage of the battery 6, in place of which any other desired source of current of constant voltage may be used. When the rectifier and the battery voltages are equal but opposite to each other, no current flows through the coil $o$. When the variable voltage of the rectifier $g$ preponderates it sends a current through the battery 6 and the auxiliary exciting coil $o$. When on the other hand the voltage of the battery preponderates it sends a current in the opposite direction through the rectifier $g$ and the coil $o$. As the rectifier, in contradistinction to the battery, allows the current to flow in one direction only, the rectifier $g$ is provided according to this modification of the invention, with a ballast resistance 7 which loads the rectifier from the beginning with a current of such a strength as can at the most arise in the circuit of the regulating coil $o$. The difference between the rectifier and battery currents can then never attain a negative value. The current therefore always flows through the rectifier in the same sense. It is convenient to so proportion the current of the rectifier by means of the ballast resistance that it does not fall below the minimum strength required to maintain the arc. By permanent lighting or auxiliary arcs care is also taken that the arc never extinguishes.

This system of connections insures an extensive and finely graded regulation of the voltage and can be worked in a simple manner. To adjust the battery to the voltage, which in turn will produce the desired voltage in the main machine, a cell switch or similar well known arrangement may be employed. This is diagrammatically indicated by the arrow, connecting coil $o$ with battery 6. The consumption of current of the battery is very small as it delivers practically no current when the system is in a state of equilibrium. When fluctuations of the current occur it will be traversed on the average just as often in a positive as in a negative direction and therefore be discharged and recharged as well. It therefore retains its charge for a long time and its electromotive force remains on the whole constant.

Intensification can be obtained according to the present invention by allowing the rectifier and its opposing electromotive force to work at a voltage which is low in proportion to the drop in the voltage (about 15 volts) in the rectifier.

Supposing for example that with a drop in voltage in the rectifier of 15 volts a mean alternating current voltage range of 30 volts is used, so that a constant counter-voltage of 15 volts is required in order to keep the current in the regulating coil at zero, then a fluctuation of ten per cent in the alternating voltage (30 volts), that is 3 volts, will produce a variation of the continuous current voltage (15 volts) likewise of 3 volts, and consequently with regard to the auxiliary exciting voltage of 20 per cent. If the secondary voltage be allowed to drop still lower, the degree of intensification will be correspondingly greater.

The rapid action is based partly on the fact that the exciting machine works in a state of indifferent equilibrium. Under the influence of the intensifying transformer it therefore adjusts itself with the greatest rapidity to the standard voltage when sudden variations in the load occur.

It is however difficult to produce the indifferent equilibrium of the exciting machine quite accurately and to maintain it under working conditions. Slight deviations in the number of turns easily produce an over or under compounding. Thus for example if the excitation is somewhat too strong the exciting machine is affected as well as the exciting current, and thus also the alternating voltage increases until a counter action is produced by the intensified continuous current voltage, which again restores equilibrium in the exciting machine. The reverse takes place when under compounding occurs.

Apart from faults in manufacture the indifferent equilibrium may be disturbed also by the fluctuation of working conditions. For example the resistance in the main exciting circuit is altered by the heating which is produced during working. The number of revolutions of the exciting machine also varies frequently in accordance with the load, particularly when it is coupled directly to the generator.

The deviation from the state of indifferent equilibrium can be compensated for example by varying the number of turns in the series winding or by similar means. It is more simple however, to disregard a perfect state of indifferent equilibrium of the exciting machine and to compensate the disturbances which occur in the regulating circuit by a supplementary regulation carried out for instance by varying the adjusting voltage in the regulating circuit or by adjusting the current in the auxiliary winding by means of a regulating resistance. A constructional form of the arrangement for carrying out this modification of the invention is shown in Figure 6. The voltage relay 10 controls the small auxiliary motor 11 which by switching on or off cells of the adjusting battery 6 compensates deviations from the standard value. The apparatus need by no means be specially sensitive, as it is only required to compensate the gradually occurring changes in the system. The quick response of the rapid regulation, the function of which is to compensate sudden and serious fluctuations in the voltage, remains unaffected thereby, while the supplementary regulation according to this modification of the invention has only to remove the residual slight deviations which remain in consequence of the inertia of the magnetic system and which cannot be otherwise completely removed.

It is frequently desired to switch off the automatic regulation for the generator and resort to regulation by hand. For this purpose it is best to wind one of the exciting coils of the exciting machine for the normal exciting voltage of the alternating current generator or to otherwise provide it with a parallel connection so that it can be brought into action by connecting it in series. If it be desired to regulate by hand the series exciting winding is short-circuited by the switch 12 as shown in Figure 6 and the regulating coil is switched over from the automatic regulating apparatus to the hand regulator 14 by the change over switch 13. Instead of a separate regulating resistance one of the ballast resistances used for the rapid regulation may be employed.

What we claim is:

1. Arrangement for rapidly regulating the voltage in mains supplied by an alternating current generator, comprising an alternating current generator, an exciting machine for said generator having a series field winding and a magnet system adapted to permit the exciting machine to operate at an indifferent equilibrium, an auxiliary field winding on the poles of said exciting machine, means for supplying current to said auxiliary winding, and means for varying the current in said auxiliary winding in accordance with the voltage variations in the mains.

2. Arrangement for rapidly regulating the voltage in mains supplied by an alternating current generator, comprising an alternating current generator, an exciting machine for said generator having a series field winding and a magnet system adapted to permit the exciting machine to operate at an indifferent equilibrium, an auxiliary field winding on the poles of said exciting machine and means for deriving current from said mains, means for rectifying said current and means for supplying said rectifying current to said auxiliary winding.

3. Arrangement for rapidly regulating the voltage in mains supplied by an alternating current generator, comprising an alternating current generator, an exciting machine for said generator having a series field winding and a magnet system adapted to permit the exciting machine to operate at an indifferent equilibrium, an auxiliary field winding on the poles of said exciting machine, a rectifier tube connected to said auxiliary winding, a transformer having its primary winding connected with said mains and its secondary winding connected to the anodes of the rectifier tube, a direct current source connected to said auxiliary winding to operate in opposition to the rectified current supplied by said rectifier and means for controlling the potential of the rectifier tube and of the direct current source.

4. Arrangement for rapidly regulating the voltage in mains supplied by an alternating current generator, comprising an alternating current generator, an exciting machine for said generator having a series field winding and a magnet system adapted to permit the exciting machine to operate at an indifferent equilibrium, an auxiliary field winding on the poles of said exciting machine, a rectifier tube connected to said auxiliary winding, a transformer having its primary winding connected with said mains and its secondary winding connected to the anodes of said rectifier, a ballast resistance connected in shunt with the rectifier cathode and said secondary winding, a battery connected in series with the rectifier cathode and said auxiliary coil and in opposite polarity with the polarity of the rectified current, the value of said shunt resistance being suitably dimensioned so that the difference between the rectifier current and the opposing battery current is sufficient to maintain the arc in the rectifier, and means for controlling the voltage of the battery current.

5. Arrangement for rapidly regulating the voltage in mains supplied by an alternating current generator, comprising an alternating current generator, an exciting machine for said generator having a series field winding and a magnet system adapted to permit the exciting machine to operate at an indifferent equilibrium, an auxiliary field winding on the poles of said exciting machine, a rectifier tube connected to said auxiliary winding, a transformer having its primary winding connected with said mains and its secondary winding connected to the anodes of said rectifier, a ballast resistance connected in shunt with the rectifier cathode and said secondary winding, a battery connected in series with the rectifier cathode and said auxiliary coil and in opposite polarity with the polarity of the rectified current, the value of said shunt resistance being suitably dimensioned so that the difference between the rectifier current and the opposing battery current is sufficient to maintain the arc in the rectifier, a cell switch for controlling the voltage of the battery current, and an electric motor for operating said switch, said motor being connected to the mains and having a voltage-sensitive relay in said connection adapted to reverse the motor in one or the other direction according to the voltage in the mains to correspondingly regulate said cell switch.

6. Arrangement for rapidly regulating the voltage in mains supplied by an alternating current generator, comprising an alternating current generator, an exciting machine for said generator having a series field winding and a magnet system adapted to permit the exciting machine to operate at an indifferent equilibrium, an auxiliary field winding on the poles of said exciting machine, a rectifier tube connected to said auxiliary winding, a transformer having its primary winding connected with said mains and its secondary winding connected to the anodes of said rectifier, a ballast resistance connected in shunt with the rectifier cathode and said secondary winding, a battery connected in series with the rectifier cathode and said auxiliary coil and in opposite polarity with the polarity of the rectified current, the value of said shunt resistance being suitably dimensioned so that the difference between the rectifier current and the opposing battery current is sufficient to maintain the arc in the rectifier, a cell switch for controlling the voltage of the battery current, and an electric motor for operating said switch, said motor being connected to the mains and having a voltage-sensitive relay in said connection adapted to reverse the motor in one or the other direction according to the voltage in the mains to correspondingly regulate said cell switch, means for disconnecting said auxiliary field winding from said battery and rectifier and for connecting it directly in shunt with said exciting machine, and hand operated means for controlling the current flowing through said coil thus connected.

In testimony whereof we affix our signatures.

REINHOLD RÜDENBERG.
CARL TRETTIN.
GERHARD KÖHLER.